(12) United States Patent
Lee

(10) Patent No.: US 10,175,783 B2
(45) Date of Patent: Jan. 8, 2019

(54) TOUCH SENSOR

(71) Applicant: Samsung Display Co., Ltd., Yongin-si (KR)

(72) Inventor: Jae Young Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/585,412

(22) Filed: May 3, 2017

(65) Prior Publication Data

US 2017/0344141 A1    Nov. 30, 2017

(30) Foreign Application Priority Data

May 25, 2016 (KR) .................. 10-2016-0064240

(51) Int. Cl.

| | |
|---|---|
| G06F 3/044 | (2006.01) |
| G06F 3/0354 | (2013.01) |
| G06F 3/041 | (2006.01) |
| G06F 1/16 | (2006.01) |
| G06F 3/0488 | (2013.01) |

(52) U.S. Cl.
CPC ........ G06F 3/03547 (2013.01); G06F 3/0416 (2013.01); G06F 1/1643 (2013.01); G06F 3/044 (2013.01); G06F 3/0488 (2013.01); G06F 2203/04112 (2013.01)

(58) Field of Classification Search
CPC ......... G06F 1/1643; G06F 2203/04112; G06F 3/03547; G06F 3/0416; G06F 3/044; G06F 3/0488
USPC .................................................. 345/170–178
See application file for complete search history.

(56) References Cited

U.S. PATENT DOCUMENTS

| | | | |
|---|---|---|---|
| 2014/0001024 A1* | 1/2014 | Liao ........................ | G06F 3/044 200/600 |
| 2014/0009428 A1* | 1/2014 | Coulson .................. | G06F 3/044 345/174 |
| 2017/0170242 A1 | 6/2017 | Choi et al. | |

FOREIGN PATENT DOCUMENTS

KR    10-2017-0070302    6/2017

* cited by examiner

*Primary Examiner* — Tony Davis
(74) *Attorney, Agent, or Firm* — H.C. Park & Associates, PLC

(57) ABSTRACT

A touch sensor including a substrate, a plurality of first sensing electrodes arranged on the substrate, a plurality of first split electrodes respectively adjacent to the plurality of first sensing electrodes, a plurality of second sensing electrodes insulated from the plurality of first sensing electrodes, and a plurality of second split electrodes respectively adjacent to the plurality of second sensing electrodes.

18 Claims, 8 Drawing Sheets

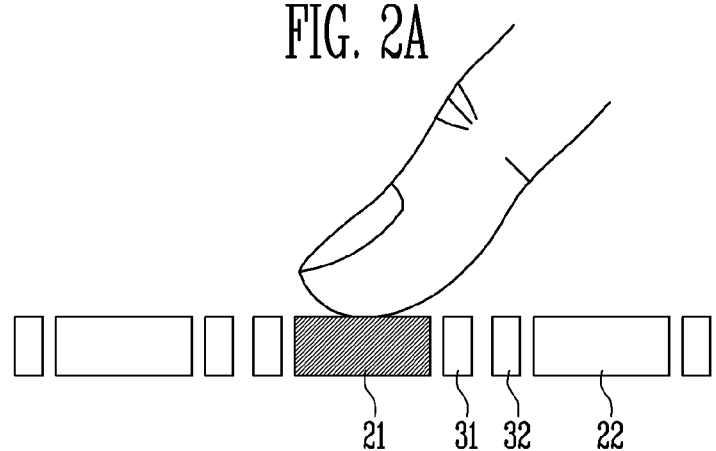
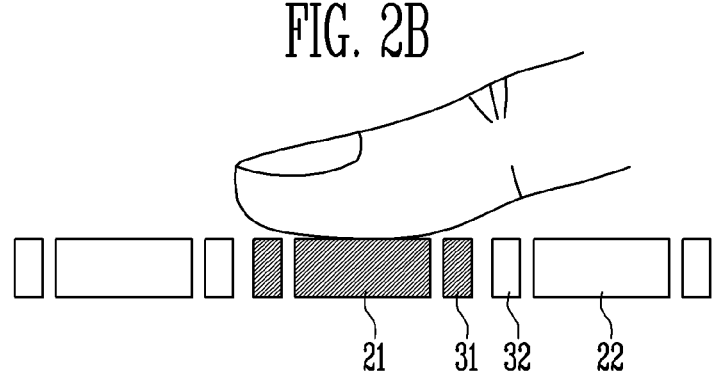
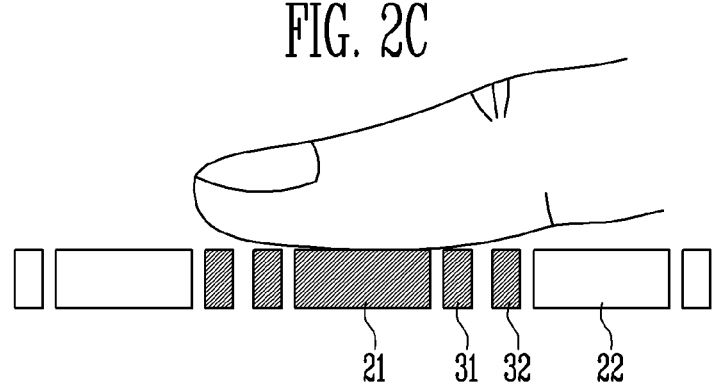

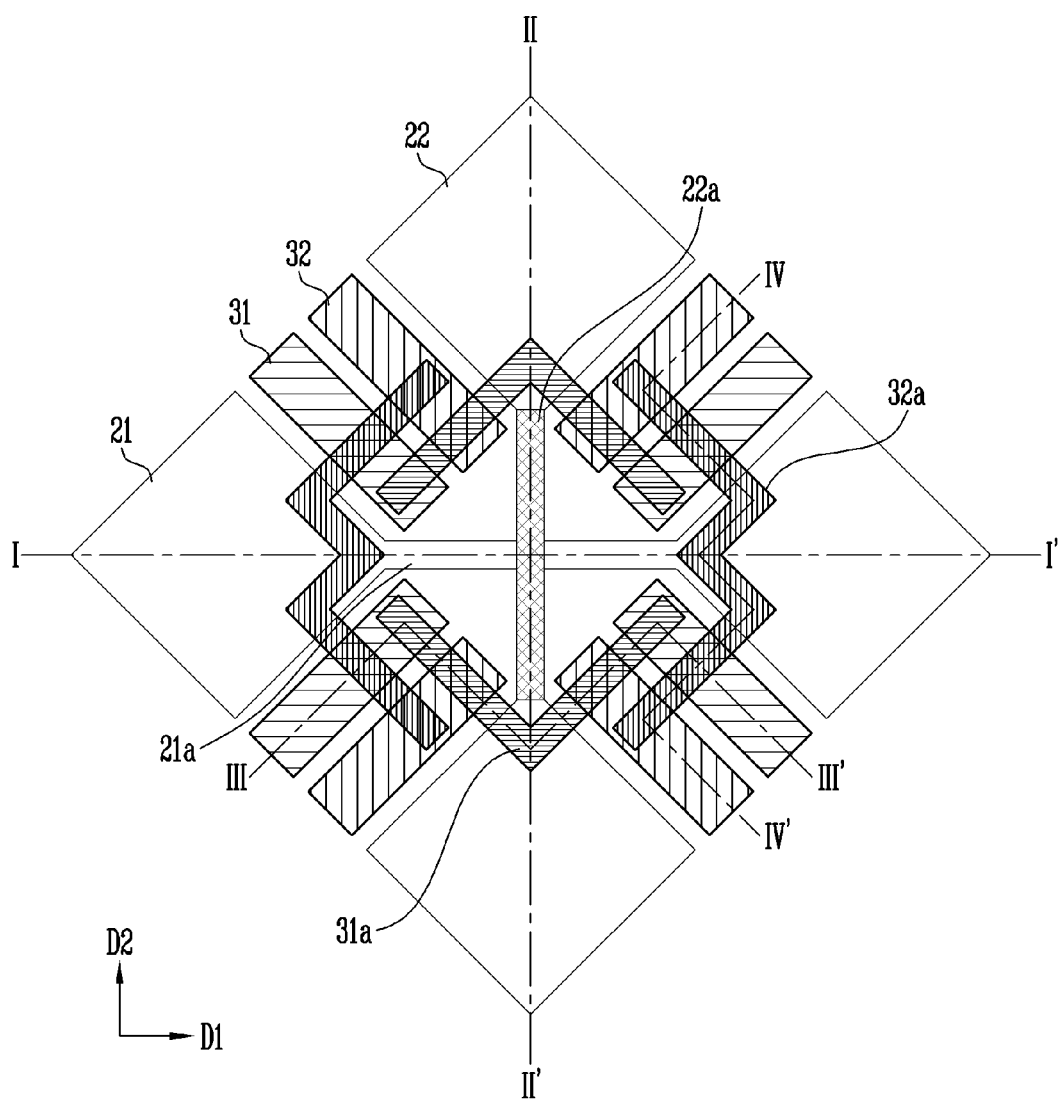

TOUCH SENSOR

CROSS-REFERENCE TO RELATED APPLICATION

This application claims priority from and the benefit of Korean Patent Application No. 10-2016-0064240, filed on May 25, 2016, which is hereby incorporated by reference for all purposes as if fully set forth herein.

BACKGROUND

Field

The invention relates generally to a touch sensor, and, more particularly, to a touch sensor having improved touch pressure sensitivity.

Discussion of the Background

A touch sensor is an input device which is able to input a command of a user by selecting an instruction, such as an instruction displayed on a screen of a display device, for example, by using a hand or an object. Such a touch sensor can be replaced with a separate input device, such as a keyboard and a mouse, connected to a display device, and the range of uses of touch sensors is gradually expanding.

The touch sensor can be implemented as a resistive film type, a light sensing type, and a capacitance type, and the like. Among these, a touch sensor implemented as a capacitance type of sensor senses a change in a capacitance formed by a conductive sensing electrode and other sensing electrodes around the conductive sensing electrode or ground electrodes when a human hand or an object contacts the touch sensor, thereby converting the contact position into an electrical signal.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have discovered that the sensitivity of a touch sensor may be improved by relating the area over which touch pressure is applied by a user to the magnitude of the pressure of the touch.

Touch sensors constructed according to the principles of the invention are capable of reducing variations in sensed pressure and/or provide greater sensitivity to touch, e.g., by determining the size of a touch area and assigning a relative touch strength value that varies in magnitude relative to the size of the touch area. More particularly, according to the principles of the invention, the size of a touch area may be incrementally determined by using split electrodes adjacent to sensing electrodes, and the magnitude of touch pressure determined based at least in part upon the size of the touch area.

According to one aspect of the invention, a touch sensor includes a substrate, a plurality of first sensing electrodes arranged on the substrate, a plurality of first split electrodes respectively adjacent to the plurality of first sensing electrodes, a plurality of second sensing electrodes insulated from the plurality of first sensing electrodes, and a plurality of second split electrodes respectively adjacent to the plurality of second sensing electrodes.

Additional aspects will be set forth in the detailed description which follows, and, in part, will be apparent from the disclosure, or may be learned by practice of the inventive concepts.

The touch sensor may further include a first connector electrically connecting the plurality of first sensing electrodes to each other in a first direction and a second connector electrically connecting the plurality of second sensing electrodes to each other in a second direction intersecting the first direction.

The first connector may include a plurality of first connecting patterns and the second connector may include a plurality of second connecting patterns.

The touch sensor may further include a third connector electrically connecting the plurality of first split electrodes to each other in the first direction, and a fourth connector electrically connecting the plurality of second split electrodes to each other in the second direction.

The third connector may include a plurality of first bridge patterns and the fourth connector may include a plurality of second bridge patterns.

The touch sensor may further include a touch controller configured to determine a magnitude of a touch pressure based on a touch input using the plurality of first sensing electrodes, the plurality of second sensing electrodes, the plurality of first split electrodes, and the plurality of second split electrodes.

The touch sensor may further include a plurality of connecting lines that connect each of the plurality of first sensing electrodes, the plurality of second sensing electrodes, the plurality of first split electrodes, and the plurality of second split electrodes, respectively, to the touch controller.

The plurality of first split electrodes and the plurality of second split electrodes may be disposed between the plurality of first sensing electrodes and the plurality of second sensing electrodes.

Each of the plurality of first split electrodes and the plurality of second split electrodes may have a smaller area and a narrower width than the corresponding area and width of each of the plurality of first sensing electrodes and the plurality of second sensing electrodes.

The plurality of first split electrodes may be respectively disposed so as to surround peripheries of the plurality of first sensing electrodes, and the plurality of second split electrodes may be respectively disposed so as to surround peripheries of the plurality of second sensing electrodes.

The plurality of second sensing electrodes may be disposed in a different layer than the layer in which the second connector is disposed.

The touch sensor may further include a plurality of insulating layers disposed between the plurality of second sensing electrodes and the second connector.

The plurality of first sensing electrodes, the plurality of second sensing electrodes, the first connector, the plurality of first split electrodes, and the plurality of second split electrodes may be disposed in the same layer.

The second connector, the third connector, and the fourth connector may be disposed in the same layer.

The plurality of first sensing electrodes, the plurality of second sensing electrodes, the plurality of first split electrodes, the plurality of second split electrodes, and the first connector are made of a transparent electrode material, and the second connector, the plurality of first bridge patterns, and the plurality of second bridge patterns are made of a conductive metal material.

The plurality of first sensing electrodes, the plurality of second sensing electrodes, the first connector, the plurality of first split electrodes, and the plurality of second split electrodes may be disposed in a first layer, and the second connector, the third connector, and the fourth connector may be disposed in a second layer different than the first layer.

The plurality of first sensing electrodes and the plurality of second sensing electrodes may have a mesh form defined by a plurality of intersecting conductive lines.

The touch sensor may further include a plurality of third split electrodes and a plurality of fourth split electrodes between the plurality of first split electrodes and the plurality of second split electrodes, a fifth connector electrically connecting the plurality of third split electrodes to each other in the first direction, and a sixth connector electrically connecting the plurality of fourth split electrodes to each other in the second direction.

The third connector may include a plurality of first bridge patterns, the fourth connector may include a plurality of second bridge patterns, the fifth connector may include a plurality of third bridge patterns and the sixth connector may include a plurality of fourth bridge patterns.

The plurality of first sensing electrodes, the plurality of second sensing electrodes, the first connector, the plurality of first split electrodes, the plurality of second split electrodes, the plurality of third split electrodes and the plurality of fourth split electrodes may be disposed in a first layer, and the second connector, the third connector, the fourth connector, the fifth connector and the sixth connector may be disposed in a second layer different than the first layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 2A, 2B, and 2C are schematic side views of touch pressure sensing by a touch sensor constructed according to the principles of the invention.

FIG. 3A is an enlarged view of area S of FIG. 1.

DETAILED DESCRIPTION OF THE ILLUSTRATED EMBODIMENTS

Figure 1:
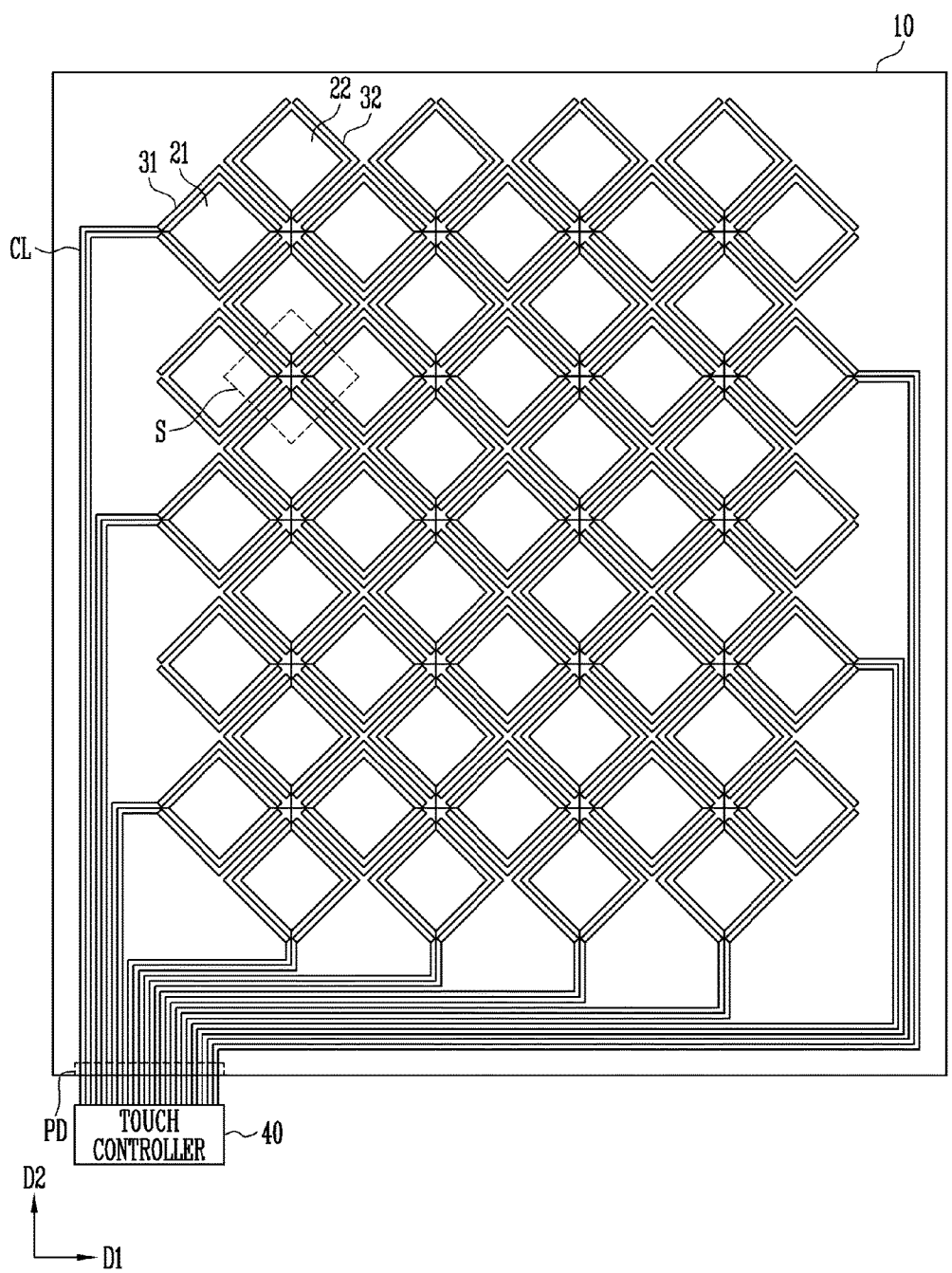
FIG. 1 is a schematic plan view of a first embodiment of a touch sensor constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, referring to the accompanying drawings, various exemplary embodiments of the invention will be described in further detail.

Referring to FIG. 1, a touch sensor includes a substrate 10, a plurality of first sensing electrodes 21, a plurality of second sensing electrodes 22, a plurality of first split electrodes 31, a plurality of second split electrodes 32, a plurality of connecting lines CL, and a touch controller 40.

The substrate 10 may be made of a transparent insulating material, or may be made of various materials such as glass, polymer, metal, or other materials known in the art. The substrate 10 may have various shapes, and the material thereof is not particularly limited. The substrate 10 may be an encapsulation substrate or a plastic film of a display panel.

The first sensing electrodes 21 are arranged on the substrate 10 and are electrically connected in a first direction D1. The plurality of second sensing electrodes 22 are arranged between the first sensing electrodes 21 and are electrically connected in a second direction D2 transverse to the first direction D1. The plurality of first sensing electrodes 21 and the plurality of second sensing electrodes 22 may be disposed on the same layer and may be alternately arranged so as not to overlap each other.

The plurality of first sensing electrodes 21 and the plurality of second sensing electrodes 22 may have various shapes, for example, a polygonal shape including a rod shape, a rhombus shape, a circular shape or some other shape. In addition, the plurality of first sensing electrodes 21 and the plurality of second sensing electrodes 22 may be made of a transparent electrode material so that light can be transmitted therethrough. The plurality of first sensing electrodes 21 and the plurality of second sensing electrodes 22 may be made of a transparent conductive material such as indium tin oxide (ITO), indium zinc oxide (IZO), antimony zinc oxide (AZO), and other materials known in the art.

Alternatively, the plurality of first sensing electrodes 21 and the plurality of second sensing electrodes 22 may have a mesh form having a structure in which a plurality of conductive lines intersect each other. The plurality of first sensing electrodes 21 and the plurality of second sensing electrodes 22 are made of a conductive metal material or a conductive nano-compound such as silver nano-wire (AgNW), carbon nano-tube, graphene, and other materials known in the art.

The plurality of first split electrodes 31 are respectively disposed adjacent to the plurality of first sensing electrodes 21 and the plurality of second split electrodes 32 are respectively disposed adjacent to the plurality of second sensing electrodes 22, as shown best in FIGS. 2A-2C. The first split electrodes 31 and the second split electrodes 32 are disposed between the first sensing electrodes 21 and the second sensing electrodes 22. The first split electrodes 31 and the second split electrodes 32 may be respectively disposed at portions of the circumferences of the first sensing electrodes 21 and the second sensing electrodes 22, or may respectively surround the first sensing electrodes 21 and the second sensing electrodes 22. The two adjacent first split electrodes 31 may be electrically connected in the first direction D1, and the two adjacent second split electrodes 32 may be electrically connected in the second direction D2.

The plurality of first split electrodes 31 and the second split electrodes 32 may have a rod-like shape having a predetermined width. In addition, the first split electrodes 31 and the second split electrodes 32 may have a smaller area and a narrower width than the first sensing electrodes 21 and the second sensing electrodes 22, respectively. Since the first split electrodes 31 and the second split electrodes 32 are disposed in a narrow space between the first sensing electrodes 21 and the second sensing electrodes 22, the first split electrodes 31 and the second split electrodes 32 may have an elongate, rod-like shape extending along one side of the first sensing electrodes 21 and the second sensing electrodes 22, respectively, and may have a very small area and a very narrow width as compared with the first sensing electrodes 21 and the second sensing electrodes 22. For example, the width of each of the first sensing electrodes 21 and the second sensing electrodes 22 may be about 3-4 mm, and the width of each of the first split electrodes 31 and the second split electrodes 32 may be about 0.2-0.3 mm.

The first split electrodes 31 may be respectively arranged so as to surround the first sensing electrodes 21, and the second split electrodes 32 may be respectively arranged so as to surround the second sensing electrodes 22. For example, in a case where each of the first sensing electrodes 21 has a quadrangle shape, the first split electrodes 31 may be symmetrically arranged so as to surround four sides of the first sensing electrode 21. Hereinafter, the description will be based on the premise that the first sensing electrodes 21 and the second sensing electrodes 22 have the same shape and size, and the first split electrodes 31 and the second split electrodes 32 have the same shape and size.

The first split electrodes 31 may have a bent shape so as to form an electrical path between the first sensing electrodes 21 and the second sensing electrodes 22. For example, the two first split electrodes 31 may be separated from each other and may surround a single first sensing electrode 21. Each of the first split electrodes 31 may be bent in an 'L' shape along one edge of the first sensing electrode 21 (see, e.g., FIG. 3A).

The first split electrodes 31 may be respectively formed as a single integrated structure so as to surround the first sensing electrodes 21. Alternatively, the first split electrodes 31 may have a structure in which four rod-shaped electrodes are separated from each other and surround the first sensing electrodes 21. The shape and the number of the first split electrodes 31 and the second split electrodes 32 described herein are merely examples. Other embodiments of the invention have different shapes and/or different numbers of first split electrodes 31 and/or second split electrodes 32.

The first split electrodes 31 and the second split electrodes 32 may be made of the same material on the same layer as the first sensing electrodes 21 and the second sensing electrodes 22. That is, the first split electrodes 31 and the second split electrodes 32 may be made of a transparent electrode material or a conductive nano-compound of a mesh form.

Each of the connecting lines CL is connected to the first and second sensing electrodes 21 and 22, and the first and second split electrodes 31 and 32 in a line unit so as to form a conductive path to the touch controller 40 through the pad unit PD. Specifically, each of the first sensing electrodes 21 and each of the first split electrodes 31 connected to each other in the first direction D1 are connected to the connecting lines CL in a line unit. Each of the second sensing electrodes 22 and each of the second split electrodes 32 connected to each other in the second direction D2 are connected to the connecting lines CL in a line unit.

The connecting lines CL may transmit a sensing input signal from the touch controller 40 to the first sensing electrodes 21 and the first split electrodes 31, and may transmit a sensing output signal from the second sensing electrodes 22 and the second split electrodes 32 to the touch controller 40.

The connecting lines CL may be formed of the same material on the same layer as the first sensing electrodes 21, the second sensing electrodes 22, the first split electrodes 31, and the second split electrodes 32.

Since the connecting lines CL are disposed outside the touch sensor, the connecting lines CL may be made from have a wide range of materials known in the art. Therefore, in addition to transparent electrode material, the connecting lines CL may be formed of a low-resistance metal material such as molybdenum (Mo), silver (Ag), titanium (Ti), copper (Cu), aluminum (Al), an alloy thereof, or the like. In addition, the connecting lines CL may be made of a single layer or a multiple layer, and in this case, the connecting lines CL may include multiple layers in which two or more metals are stacked.

The touch controller 40 may determine a touch position and a magnitude of a touch pressure based on whether the first sensing electrodes 21 and the second sensing electrodes 22, and whether the first split electrodes 31 and the second split electrodes 32 are touched. The touch sensor here is a touch sensor of the capacitance type known in the art. When a touch object such as a human hand or a stylus pen touches the touch sensor, a capacitance variation according to a contact position is transmitted from the first sensing electrodes 21 and the second sensing electrodes 22, and from the first split electrodes 31 and the second split electrodes 32 via the connecting lines CL and via the pad unit PD to the touch controller 40. Then, the touch controller 40 converts the capacitance variation into an electrical signal, thereby determining a touch position corresponding to the touch input.

In addition, the touch controller 40 may differentially sense a touch area by analyzing a touch input of the first split electrodes 31 and the second split electrodes 32 respectively adjacent to the first sensing electrodes 21 and the second sensing electrodes 22, and may determine a magnitude of a touch pressure corresponding to the touch area.

For example, referring to FIG. 2A, when a touch input occurs at a first sensing electrode 21 and a touch input does not occur in the first split electrodes 31 and the second split electrodes 32 adjacent to the first sensing electrode 21 in which the touch input occurs, the touch area may be determined to be relatively small. In this case, since the touch area is relatively small, the touch controller 40 determines that the magnitude of a touch pressure is small.

Referring to FIG. 2B, when a touch input occurs at a first sensing electrode 21 and a first split electrode 31 adjacent to the first sensing electrode 21, the touch area may be determined to be of medium size. In this case, since the touch area is medium, the touch controller 40 determines that the magnitude of a touch pressure is medium.

Referring to FIG. 2C, when a touch input occurs at a first sensing electrode 21, first split electrodes 31 and the second split electrodes 32 adjacent to the first sensing electrode 21, the touch area may be determined to be relatively large. Then, since the touch area is relatively large, the touch controller 40 determines that the magnitude of touch pressure is large.

Three magnitudes of touch pressures are described here, but other embodiments of the invention may have a different number of magnitudes of touch pressures other than three. The number of discrete levels of magnitude of a touch pressure may vary according to the number and the shape of split electrodes between sensing electrodes.

When a touch input extensively occurs in a plurality of first sensing electrodes 21, a plurality of second sensing electrodes 22, a plurality of first split electrodes 31, and a plurality of second split electrodes 32, the touch controller 40 may determine the magnitude of touch pressure based on a position at which the touch input sequentially occurs. In general, when a touch input is performed by using a finger, the touch input of an outer area occurs relatively later than a touch input of a center area. Here, the center area corresponds to a touch input at an initial time, and the outer area corresponds to a touch input after the initial time. When a touch area is gradually expanded due to a pressure applied during a touch, the touch controller 40 may determine that the touch pressure increases as the touch area increases. Therefore, the touch controller 40 may determine the magnitude of the touch pressure based on the sequentially expanding position(s) in which a touch input occurs.

Figure 3B:
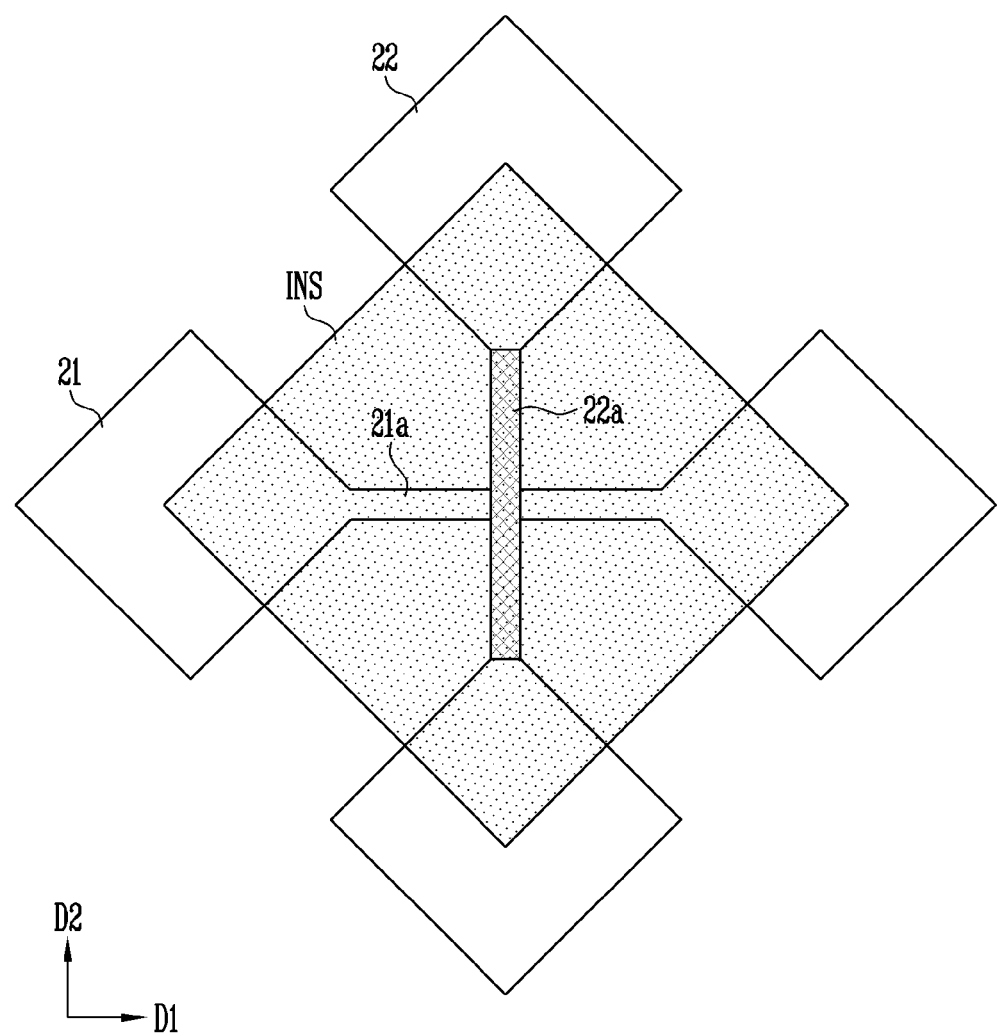
FIG. 3B is a schematic plan view of a connection structure of a plurality of first sensing electrodes and a plurality of second sensing electrodes of FIG. 3A.
Figure 3C:
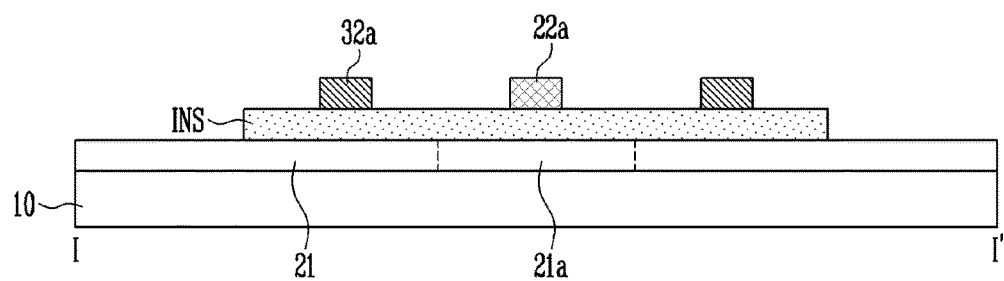
FIG. 3C is a cross-sectional view of a touch sensor taken along line I-I' of FIG. 3A.
Figure 3D:
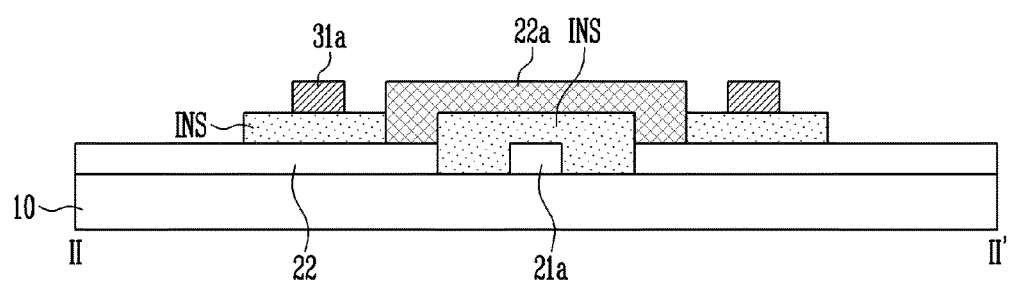
FIG. 3D is a cross-sectional view of a touch sensor taken along line II-II' of FIG. 3A.
Figure 3E:
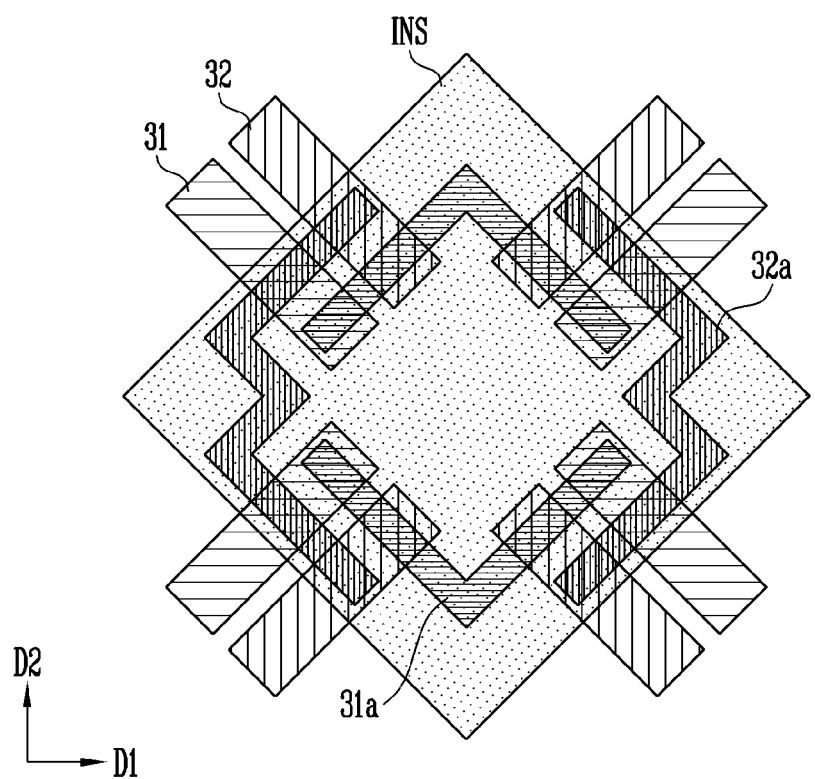
FIG. 3E is a schematic plan view of a connection structure of a plurality of first split electrodes and a plurality of second split electrodes of FIG. 3A.
Figure 3F:
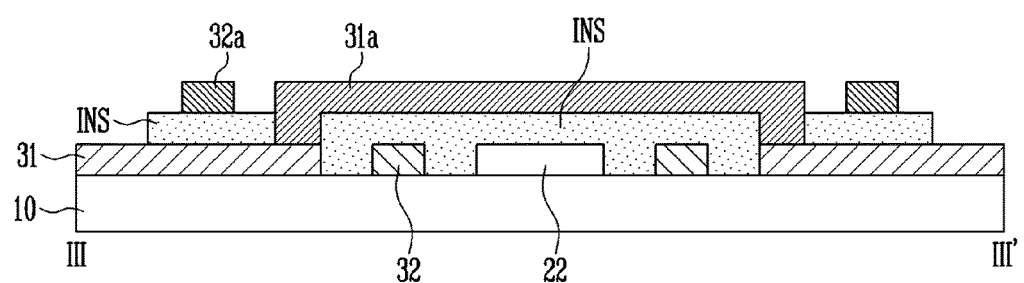
FIG. 3F is a cross-sectional view of a touch sensor taken along line III-III' of FIG. 3A.
Figure 3G:
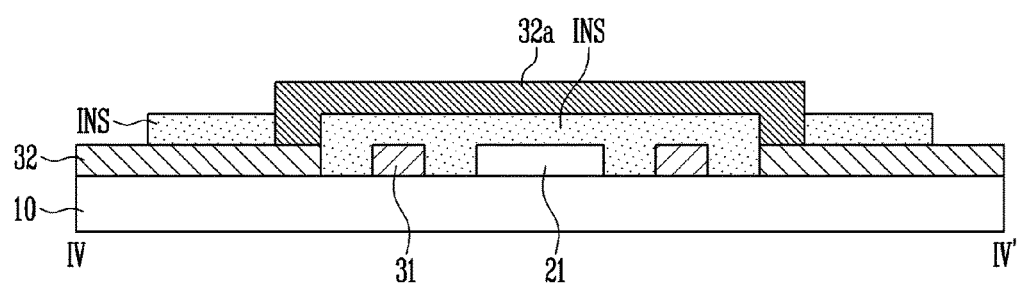
FIG. 3G is a cross-sectional view of a touch sensor taken along line IV-IV' of FIG. 3A.

Referring to FIGS. 3A-3G, for convenience, only areas corresponding to a pair of first sensing electrodes 21 and a pair of second sensing electrodes 22 adjacent to each other are shown. However, in an actual touch sensor constructed according to the principle of the invention the structure shown in FIG. 3A is repeatedly arranged over an active touch sensing area.

Referring to FIGS. 3A, 3B, 3C, and 3D, the touch sensor may further include a plurality of first connecting patterns 21a electrically connecting the first sensing electrodes 21 to each other, a plurality of second connecting patterns 22a electrically connecting the second sensing electrodes 22 to each other, and a plurality of insulating layers INS disposed between the first connecting patterns 21a and second connecting patterns 22a.

The first connecting patterns 21a electrically connect the two adjacent first sensing electrodes 21 to each other, and the second connecting patterns 22a electrically connect the two adjacent second sensing electrodes 22 to each other. The first connecting patterns 21a and the second connecting patterns 22a are partially overlapped with each other in an area where they intersect, but are insulated by the insulating layers INS.

The first connecting patterns 21a may be integrally formed with the first sensing electrodes 21 such that they are not separated from the first sensing electrodes 21. For example, the first connecting patterns 21a in addition to the first sensing electrodes 21 and the second sensing electrodes 22 may be made of a transparent electrode material. In the case where the first connecting patterns 21a are made of a transparent electrode material, the process of fabricating the touch sensor can be simplified by integrally patterning the first sensing electrodes 21 and the first connecting patterns 21a in a line unit in the first direction D1 during a step of patterning the transparent electrode material.

The second connecting patterns 22a may be formed of different material in a different layer from the second sensing electrodes 22. For example, the second connecting patterns 22a are separated from the second sensing electrodes 22, and are electrically connected to the second sensing electrodes 22 at an upper portion or a lower portion of the second sensing electrodes 22, thereby connecting the second sensing electrodes 22 in a line unit in the second direction D2.

For example, the second connecting patterns 22a may be made of at least one material selected from metals such as gold (Au), silver (Ag), aluminum (Al), molybdenum (Mo), chromium (Cr), titanium (Ti), nickel (Ni), neodymium (Nd), copper (Cu), or alloys of the metals. In addition, the second connecting patterns 22a may be formed of a single layer or multiple layers in which two or more of the metals and the alloys are stacked. However, in the case where the second connecting patterns 22a are made of an opaque material, the width, thickness, and length of the second connecting patterns 22a may be adjusted so as to prevent the second connecting patterns 22a from being visible to a user. The width of each of the second connecting patterns 22a may be narrower than the width of each of the first connecting patterns 21a formed of a transparent electrode material. Or, the second connecting patterns 22a may be designed to be inclined in an oblique direction so as to more effectively prevent the second connecting patterns 22a from being visible.

Alternatively, the first connecting patterns 21a and the second connecting patterns 22a may have a mesh form defined by a plurality of intersecting conductive lines. The first connecting patterns 21a and the second connecting patterns 22a may be made of a conductive metal material, or conductive nano-compound such as silver nano-wire (AgNW), carbon nano-tube, graphene, and the like.

The insulating layer INS may be an organic insulating layer or an inorganic insulating layer. When the insulating layer INS is an organic insulating layer, it may include an organic insulating material such as a polyacryl-based compound, a polyimide-based compound, a fluorine-based carbon compound such as Teflon, a benzocyclobutene compound, or the like. When the insulating layer INS is an inorganic insulating layer, it may include an inorganic insulating material such as polysiloxane, silicon nitride, silicon oxide, or the like.

Referring to FIGS. 3A, 3E, 3F and 3G, the touch sensor may further include a plurality of first bridge patterns 31a electrically connecting the first split electrodes 31 to each other, and a plurality of second bridge patterns 32a electrically connecting the second split electrodes 32 to each other.

The first bridge patterns 31a electrically connect two adjacent first split electrodes 31 to each other in the first direction D1, and the second bridge patterns 32a electrically connect two adjacent second split electrodes 32 to each other in the second direction D2.

The first bridge patterns 31a and the second bridge patterns 32a may be made of a different material in a different layer from the first sensing electrodes 21 and the second sensing electrodes 22. For example, the first bridge patterns 31a may be separated from the first split electrodes 31, and may be electrically connected to the first split electrodes 31 at an upper portion or a lower portion of the first split electrodes 31, thereby connecting the first split electrodes 31 in a line unit in the first direction D1. In addition, the second bridge patterns 32a may be separated from the second split electrodes 32, may be electrically connected to the second split electrodes 32 at an upper portion or a lower portion of the second split electrodes 32, thereby connecting the second split electrodes 32 in a line unit in the second direction D2.

The first bridge patterns 31a and the second bridge patterns 32a may have an elongated, rod-like shape having a predetermined width. In addition, the first bridge patterns 31a and the second bridge patterns 32a may have a bent shape so as to form an electrical path while minimizing overlap with other patterns. For example, the first bridge patterns 31a may be bent in an 'L' shape along a circumference of the area where the first connecting patterns 21a and the second connecting patterns 22a intersect so as not to overlap the first connecting patterns 21a and the second connecting patterns 22a. Further, the second bridge patterns 32a may be bent in a 'W' shape along a circumference of the area where the first connecting patterns 21a and the second connecting patterns 22a intersect.

Each of the two first bridge patterns 31a and the two second bridge patterns 32a may be symmetrically disposed with respect to the area where the first connecting patterns 21a and the second connecting patterns 22a intersect. For example, one first bridge pattern 31a disposed in an upper side may electrically connect the two first split electrodes 31 disposed in an upper side to each other, and the other first bridge pattern 31a in a lower portion may electrically connect the other two first split electrodes 31 disposed in a lower side to each other. Here, the first bridge pattern 31a disposed in an upper side and the first bridge pattern 31a disposed in a lower side have a symmetrical structure. Likewise, the second bridge pattern 32a disposed in a left side and the second bridge pattern 32a disposed in a right side have a symmetrical structure.

The first bridge patterns 31a and the second bridge patterns 32a may be made of the same material on the same layer as the second connecting patterns 22a. For example, the first bridge patterns 31a and the second bridge patterns 32a may be made of at least one conductive metal material or of an alloy of the conductive metal materials as described above. In addition, the first bridge patterns 31a and the second bridge patterns 32a may be made of a single layer or of multiple layers in which two or more materials of the metals and the alloys are stacked.

Alternatively, the first bridge patterns 31a and the second bridge patterns 32a may have a mesh form defined by a plurality of intersecting, conductive lines cross. The first bridge patterns 31a and the second bridge patterns 32a may be made of a conductive metal material or a conductive nano-compound.

The shape, the position, and/or the material of the first bridge patterns 31a and/or the second bridge patterns 32a may be different than the shape(s), position(s) and material(s) described herein.

The insulating layer INS may be disposed between the first bridge patterns 31a and the second split electrodes 32, between the first bridge patterns 31a and the second sensing electrodes 22, between the second bridge patterns 32a and the first split electrodes 31, and between the second bridge patterns 32a and the first sensing electrodes 21 so as to insulate each of those pairs of materials one from the other, respectively.

The insulating layer INS may be partially disposed between the patterns to be insulated or may be entirely formed in a touch active area of the touch sensor.

Figure 4:
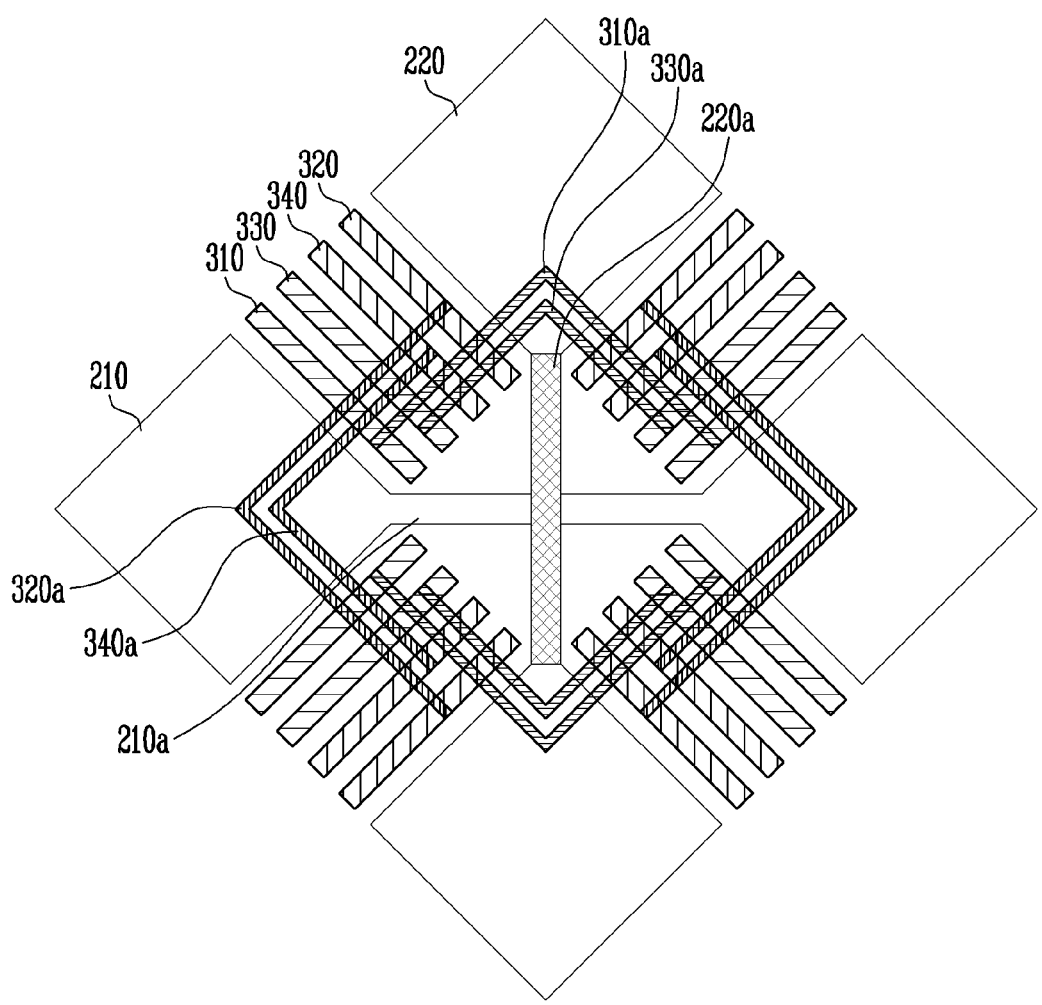
FIG. 4 is an enlarged plan view of a second embodiment of a portion of a touch sensor constructed according to the principles of the invention.

Referring now to FIG. 4, for convenience, only areas corresponding to a pair of first sensing electrodes 210 and a pair of second sensing electrodes 220 adjacent to each other are shown. However, in an actual touch sensor constructed according to the principle of the invention the structure shown in FIG. 4 is repeatedly arranged over an active touch sensing.

The touch sensor may further include a plurality of third split electrodes 330 and a plurality of fourth split electrodes 340 between a plurality of first split electrodes 310 and a plurality of second split electrodes 320, a plurality of third bridge patterns 330a electrically connecting a plurality of third split electrodes 330 to each other, and a plurality of fourth bridge patterns 340a electrically connecting a plurality of fourth split electrodes 340 to each other.

The third split electrodes 330 may be separated from the first split electrodes 310 by a predetermined distance and may be symmetrically arranged so as to surround four sides of a first sensing electrode 210. The fourth split electrodes 340 may be separated from the second split electrodes 320 by a predetermined distance and may be symmetrically arranged so as to surround four sides of a second sensing electrode 220. The first split electrodes 310, the second split electrodes 320, the third split electrodes 330, and the fourth split electrodes 340 are insulated from each other. The shape and the material of the third split electrodes 330 and the fourth split electrodes 340 are substantially the same as those of the first split electrodes 31 and the second split electrodes 32 described above. Therefore, duplicate descriptions thereof are omitted here to avoid redundancy.

The third bridge patterns 330a electrically connect the two adjacent third split electrodes 330 to each other in the first direction D1, and the fourth bridge patterns 340a electrically connect the two adjacent fourth split electrodes 340 to each other in the second direction D2. The shape and the material of the third bridge patterns 330a and the fourth bridge patterns 340a are substantially the same as those of the first bridge patterns 31a and the second bridge patterns 32a described above. Therefore, duplicate descriptions thereof are omitted here to avoid redundancy.

In addition to the exemplary embodiments as described above, the number of the split electrodes disposed between the sensing electrodes may vary according to the size and the desired touch sensitivity of the touch sensor.

According to the principles of the invention described herein, the size of a touch area may be incrementally determined by using one or more sets of relatively small split electrodes respectively adjacent to larger sets of sensing electrodes, and the magnitude of a touch pressure is determined based at least in part upon the size of the touch area.

When a touch sensor is made of an inelastic rigid substrate such as glass, a touch pressure can be sensed by a capacitive method.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch sensor comprising:
    a substrate;
    a plurality of first sensing electrodes arranged on the substrate;
    a plurality of first split electrodes respectively adjacent to the plurality of first sensing electrodes;
    a plurality of second sensing electrodes insulated from the plurality of first sensing electrodes;
    a plurality of second split electrodes respectively adjacent to the plurality of second sensing electrodes;
    a first connector electrically connecting the plurality of first sensing electrodes to each other in a first direction;
    a second connector electrically connecting the plurality of second sensing electrodes to each other in a second direction intersecting the first direction;
    a third connector electrically connecting the plurality of first split electrodes to each other in the first direction; and
    a fourth connector electrically connecting the plurality of second split electrodes to each other in the second direction,
    wherein the third connector and the fourth connector are disposed in the same layer.

2. The touch sensor of claim 1, wherein the first connector comprises a plurality of first connecting patterns and the second connector comprises a plurality of second connecting patterns.

3. The touch sensor of claim 1, wherein the third connector comprises a plurality of first bridge patterns and the fourth connector comprises a plurality of second bridge patterns.

4. The touch sensor of claim 1, further comprising:
    a touch controller configured to determine a magnitude of a touch pressure based on a touch input using the plurality of first sensing electrodes, the plurality of second sensing electrodes, the plurality of first split electrodes, and the plurality of second split electrodes.

5. The touch sensor of claim 4, further comprising:
    a plurality of connecting lines that connect each of the plurality of first sensing electrodes, the plurality of second sensing electrodes, the plurality of first split electrodes, and the plurality of second split electrodes, respectively, to the touch controller.

6. The touch sensor of claim 1, wherein
    the plurality of first split electrodes and the plurality of second split electrodes are disposed between the plurality of first sensing electrodes and the plurality of the second sensing electrodes.

7. The touch sensor of claim 1, wherein
    each of the plurality of first split electrodes and the plurality of second split electrodes has a smaller area and a narrower width than the corresponding area and width of each of the plurality of first sensing electrodes and the plurality of second sensing electrodes.

8. The touch sensor of claim 1, wherein
the plurality of first split electrodes are respectively disposed so as to surround peripheries of the plurality of first sensing electrodes, and
the plurality of second split electrodes are respectively disposed so as to surround peripheries of the plurality of second sensing electrodes.

9. The touch sensor of claim 1, wherein
the plurality of second sensing electrodes are disposed in a different layer than a layer in which the second connector is disposed.

10. The touch sensor of claim 9, further comprising:
a plurality of insulating layers disposed between the plurality of second sensing electrodes and the second connector.

11. The touch sensor of claim 1, wherein
the plurality of first sensing electrodes, the plurality of second sensing electrodes, the first connector, the plurality of first split electrodes, and the plurality of second split electrodes are disposed in the same layer.

12. The touch sensor of claim 1, wherein
the second connector, the third connector, and the fourth connector are disposed in the same layer.

13. The touch sensor of claim 1, wherein
the plurality of first sensing electrodes, the plurality of second sensing electrodes, the plurality of first split electrodes, the plurality of second split electrodes, and the first connector are made of a transparent electrode material, and
the second connector, the third connector, and the fourth connector are made of a conductive metal material.

14. The touch sensor of claim 1, wherein
the plurality of first sensing electrodes, the plurality of second sensing electrodes, the first connector, the plurality of first split electrodes, and the plurality of second split electrodes are disposed in a first layer, and
the second connector, the third connector, and the fourth connector are disposed in a second layer different than the first layer.

15. The touch sensor of claim 1, wherein
the plurality of first sensing electrodes and the plurality of second sensing electrodes have a mesh form defined by a plurality of intersecting conductive lines.

16. The touch sensor of claim 1, further comprising:
a plurality of third split electrodes and a plurality of fourth split electrodes disposed between the plurality of first split electrodes and the plurality of second split electrodes;
a fifth connector electrically connecting the plurality of third split electrodes to each other in the first direction; and
a sixth connector electrically connecting the plurality of fourth split electrodes to each other in the second direction.

17. The touch sensor of claim 16, wherein the third connector comprises a plurality of first bridge patterns, the fourth connector comprises a plurality of second bridge patterns, the fifth connector comprises a plurality of third bridge patterns and the sixth connector comprises a plurality of fourth bridge patterns.

18. The touch sensor of claim 1, wherein
the plurality of first sensing electrodes, the plurality of second sensing electrodes, the first connector, the plurality of first split electrodes, the plurality of second split electrodes, the plurality of third split electrodes and the plurality of fourth split electrodes are disposed in a first layer, and
the second connector, the third connector, the fourth connector, the fifth connector and the sixth connector are disposed in a second layer different than the first layer.

* * * * *